UNITED STATES PATENT OFFICE.

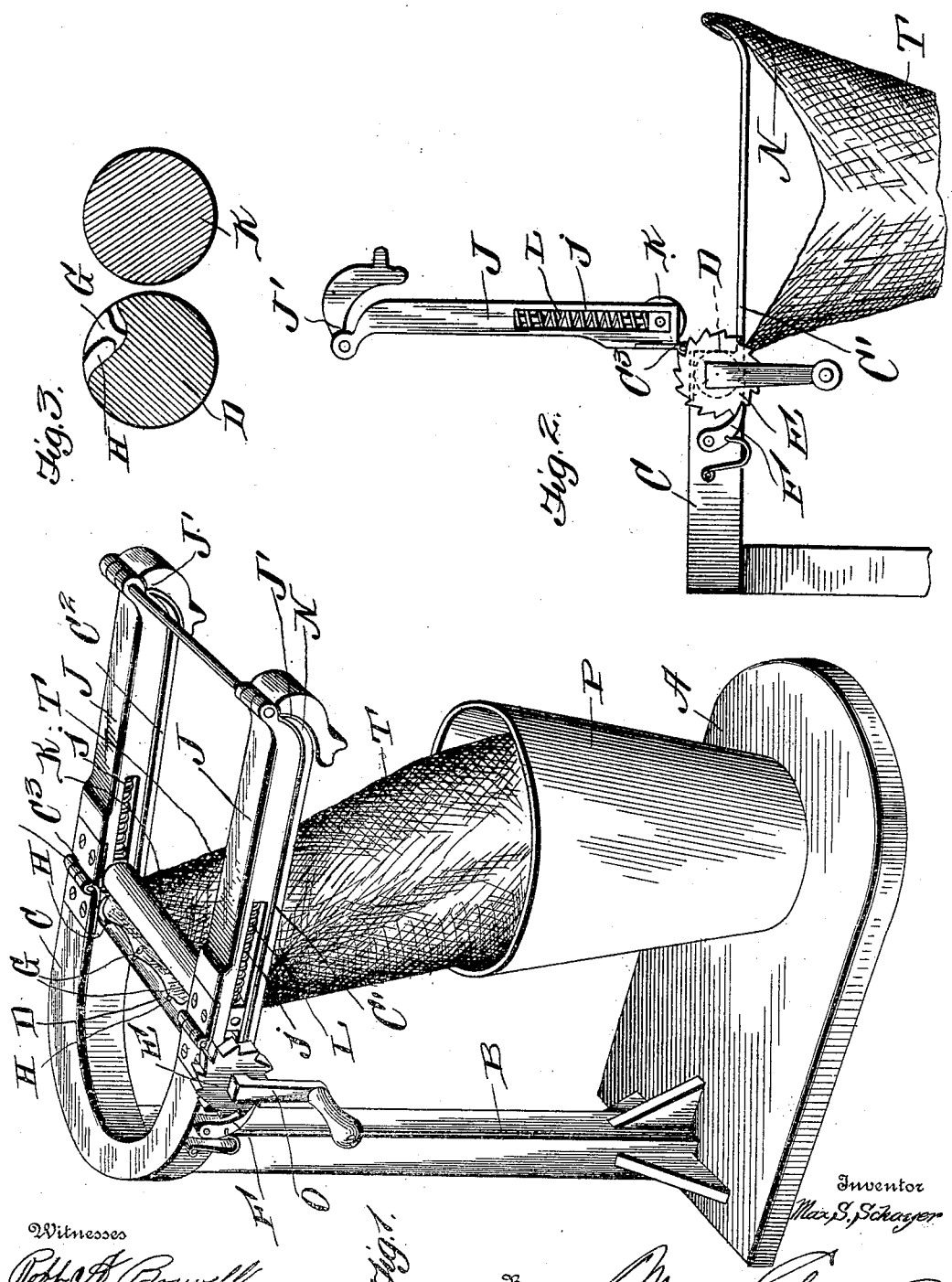

MAX S. SCHAYER, OF DENVER, COLORADO.

JELLY-PRESS.

No. 824,592. Specification of Letters Patent. Patented June 26, 1906.

Application filed July 8, 1905. Renewed May 19, 1906. Serial No. 317,797.

*To all whom it may concern:*

Be it known that I, MAX S. SCHAYER, a citizen of the United States, residing in the city and county of Denver, State of Colorado, have invented certain new and useful Improvements in Jelly-Presses, of which the following is a description, reference being had to the accompanying drawings, and to the letters of reference marked thereon.

My invention relates to jelly-presses, and has for its object to produce a simple, compact, and inexpensive construction by which the juice from berries or other fruit may be expressed.

The invention consists in the construction and combination of elements hereinafter described, and particularly pointed out in the claims.

Referring to the drawings, Figure 1 is a perspective view of the complete device in position to operate. Fig. 2 is a side elevation showing the swinging arms in open position, and Fig. 3 is a cross-sectional view through the rollers.

In the drawings, A is a base to which is secured an upright B, to the upper end of which is secured a U-shaped frame C, having its arms C' C² extending forward over the base A. Near the upright B a roller D is journaled in the arms C' C², the roller being provided on one end outside the journal with a ratchet-wheel E, with which a pawl F, pivoted on the side of the U-shaped frame, engages. The roller D is provided between the arms C' C² with hooks or buttons G G, preferably set in recesses H H so that their heads will be flush with the surface of the roller, adapted to engage the jelly-bag T near its mouth.

Hinged to the arms C' C² near the roller D, as shown at C³, is a pair of arms J J, having a roller K journaled in them near their hinged ends, adapted when swung into closed position to bring the roller K near to and parallel with the roller D and when swung into open position to carry the roller K upward away from the roller D, so as to permit of free access to the roller D. The arms C' C² are preferably recessed, as shown, to receive the arms J J in their closed position, and the arms J J are each provided at their free ends with locking devices or latches J' to engage the ends of arms C' C² to hold the arms J J in closed position. If preferred, the roller K may be made yielding by forming the openings $j$ in the arms J J, in which it is journaled, of such shape as to permit of movement lengthwise of the arms and by arranging springs L to bear against these journals to press the roller K toward the roller D. These springs, if used, are preferably located in recesses M, formed in the arms J J. Near their outer ends the arms C' C² are provided with hooks N on their inner sides.

The ratchet-wheel E is preferably formed in one piece with a crank-shaft and crank O, preferably angular in cross-section, fitting a corresponding axial opening in the roller D.

P is a receptacle of any convenient form to receive the juices expressed, as hereinafter explained.

In the use of the invention the arms J J, with the roller K, are swung to open position, leaving the hooks N exposed. A jelly-bag, of cheese-cloth, muslin, or other convenient material, is then placed between the arms C' C², and the edges of its mouth are engaged on one side with the hooks or buttons G G of the roller D, which is prevented from turning by the engagement of the pawl F with the ratchet-wheel E, and the edges of its mouth on the other side are engaged with the hooks N. The bag is thus held open to receive the fruit from which the juices are to be expressed. The receptacle P being in position, the boiled fruit, preferably as it comes from the kettle, may be introduced into the jelly-bag without danger of burning the hands. When the fruit has thus been introduced, the edges of the mouth of the bag which were engaged with the hooks N are disengaged and are engaged with the hooks or buttons G G of the roller D. The arms J J are then swung to closed position, as shown in Fig. 1, and are locked in closed position by the locking devices J'. The roller D is then rotated by the crank O, winding the jelly-bag upon it and drawing the bag and its contents up between the rollers and gradually expressing the juice from the fruit. If it is desired to let the juices drain slowly from the bag, the movement of the roller D may be arrested at any time, and by means of the pawl F and ratchet E the bag will be held in position as long as may be desired. After the juices have been sufficiently expressed the pawl F may be disengaged from the ratchet-wheel, the arms J J lifted, and the bag and whatever remains in it may be removed.

The parts above described, with the exception of the base A, are preferably made of cast-iron or other material which will be sufficiently strong and unyielding.

It will of course be understood that while I have described my invention as a jelly-press it is adapted and intended for pressing or straining the liquid or juice from soups, sauces, and generally in material from which it is desired to separate the liquid or juice.

Having thus described my invention, what I claim, and desire to secure by Letters Patent, is—

1. In a jelly-press, a frame, a pair of expressing-rollers, one of which is movable from the other to permit the insertion of a jelly-bag, means carried by the relatively stationary roller for engaging the bag, and means carried by the frame for engaging a second portion of the bag to hold the same open during filling.

2. In a jelly-press, the combination of a roller provided with means for engaging a jelly-bag, arms in which the roller is journaled, means for rotating the roller, arms hinged to said first-mentioned arms, and a second roller journaled in said hinged arms parallel with the first-mentioned roller.

3. In a jelly-press, the combination of a roller provided with means for engaging a jelly-bag, a pair of arms in which the roller is journaled, means for rotating the roller, a second pair of arms hinged to said first-mentioned arms, a second roller journaled in said hinged arms parallel with said first-mentioned roller, the hinge connection between the arms carrying the first-mentioned roller and those carrying the second roller being so arranged that when the latter arms are in closed position the second roller will be near and in the plane of the other roller and when in open position the second roller will be out of the way so as to permit access to the first roller.

4. In a jelly-press, the combination of a roller provided with means for engaging a jelly-bag, a pair of arms in which the roller is journaled, means for rotating the roller, a second pair of arms hinged to said first-mentioned arms, a second roller journaled in said hinged arms parallel with said first-mentioned roller, the hinge connection between the arms carrying the first-mentioned roller and those carrying the second roller being so arranged that when the latter arms are in closed position the second roller will be near and in the plane of the other roller and when in open position the second roller will be out of the way so as to permit access to the first roller, and means for locking the hinged arms in closed position.

5. In a jelly-press, the combination of a base, an upright secured thereto, a U-shaped frame carried by the standard having its arms extending over the base, a roller journaled in the frame near the upright and provided with means for engaging a jelly-bag, hooks near the outer ends of the arms of the frame, arms carrying a second roller hinged to the frame near the first-mentioned roller, and means for rotating the first-mentioned roller.

6. In a jelly-press, the combination of a base, an upright secured thereto, a U-shaped frame carried by the standard and having its arms extending over the base, a roller journaled in the frame near the upright and provided with means for engaging a jelly-bag, hooks near the outer ends of the arms of the frame, arms carrying a second roller hinged to the frame near the first-mentioned roller, means for rotating the first-mentioned roller, and a ratchet and pawl for locking the roller.

In testimony whereof I affix my signature in presence of two witnesses.

MAX S. SCHAYER.

Witnesses:
LEE KAYSER,
D. J. McRAE.